3,424,652
METHOD AND DEVICE FOR THE SUPERVISION OF INSTALLATIONS, IN PARTICULAR SAFETY SWITCHING SYSTEM OF NUCLEAR REACTORS
Manfred Oehmann, Wattwil, Switzerland, assignor to Gesellschaft fur Kernforschung mbH, Postfach, Germany
Filed Apr. 26, 1966, Ser. No. 546,141
U.S. Cl. 176—19                                    8 Claims
Int. Cl. G21c 7/00, 17/00

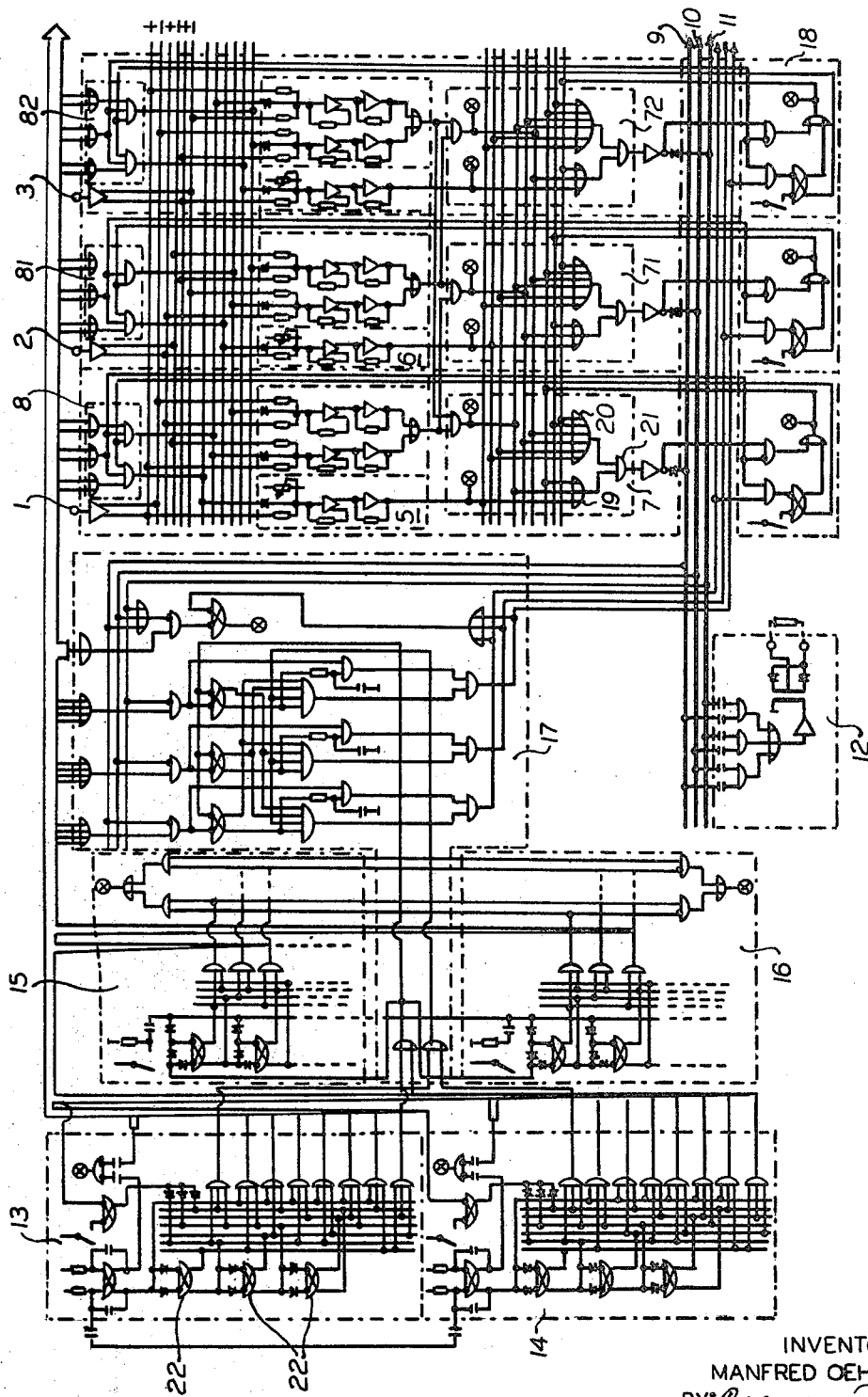

ABSTRACT OF THE DISCLOSURE

Safety system for supervising installations, including multiple separate safety channels having test signal generators, test signal receivers, means for producing output test signals from the system being monitored, means for comparing the input and output test signals to produce a composite disturbance signal, means for producing a correction signal responsive to the disturbance signal, and means responsive to the correction signal whereby correction of a defect or error resulting in the disturbance signal is automatically eliminated. The system is an $m$-out-of-$n$ system which automatically converts to a $p$-out-of-$q$ system upon an error being present, and which operates in such a manner that the self-repair time is shorter than the minimum permissible monitoring off-line time of the system.

---

The invention relates to a method and a device for the supervision of installations, especially of safety switching devices of nuclear reactors.

Installations whose operating variables are to be influenced in predetermined way for this purpose are mostly equipped with a positioning element. The measuring equipment essentially consists of receivers for the measured variables, perhaps also of transducers, and the positioning device is made up of positioning elements. Between the receivers of the measured variables and the positioning elements there is a reference device which compares the measured variables produced by the receivers with each other and/or with preset variables and produces the corresponding positioning variables. The variables are fed into the positioning elements which influences the preset operating variables in a predetermined way by means of positioning elements.

This may be a problem of setting certain operating data and keeping them constant, a task sufficiently known from control engineering. However, it may also be a problem of effecting a change in an operating variable by preset positioning elements no sooner than predetermined maxima or minima (critical values) of operating data are exceeded or not reached, respectively, or when predetermined operating data deviate from each other unduly (reference). This latter task is given e.g. in the safety system for the fast shutdown of a nuclear reactor. For, if the neutron flux in a nuclear reactor increases unduly, shutdown rods are introduced in the core of that reactor which reduce the neutron flux to zero thus shutting the reactor down.

Now, it is necessary for safety reasons in nuclear reactors and a series of other installations to prevent an undue deviation from preset limits or reference values under any condition, because otherwise there would be major damage. However, since the safety devices are exposed to the influences of wear and tear and of the environment (e.g. corrosion), it is necessary to check the function of these installations themselves continuously and to replace faulty components.

The methods of testing so far employed, which used pulse-like testing values among others, essentially consisted in checking the system by means of these testing values and in replacing faulty components located in the process. At least for the time between the determination of the faulty components and their replacement the system is not in use and thus cannot furnish any safety. Even if checks were made within very short periods, so that a fault would be detected almost immediately when it was arising, this would still constitute a considerable lack of safety.

It is the aim of this invention to create a method of and a device for the supervision of facilities avoiding the disadvantages mentioned above.

This is done in the invention by a method of supervising installations especially safety switching systems for nuclear reactors, by means of testing values, i.e. by linking testing values fed into the system (input testing values) with values taken out of the system which are functionally dependent upon the input values (output values) so as to result in common values (disturbance quantities) and releasing as a function of the disturbance quantities an operation (correction) counteracting any faults arising in the system in a preset way. In this connection it is useful to convert the disturbance quantities into quantities effecting the correction (correction quantities).

This invention will be best understood by reference to the accompanying drawing which is a circuit diagram of the invention.

It is a special advantage to test the system to be monitored repeatedly in preset instances by short-time (pulse-like) testing values in a predetermined scope. Absolute safety for the system is attained in this way only when the time between testing events (test cycle) including the time up to the release of the correction operations is as long as or shorter than the time between a preset load upon the system to be monitored and the repercussion this produces upon the system (response time of the system). In a reactor switching safety system this response time is determined by the time between the input of measured variables in the safety system resulting in a fast shutdown and the release of this scram.

In addition, it is a special advantage that not only output testing values caused by input testing values are produced by comparison with the input testing values, thus generating disturbance quantities which are transformed into values effecting correction, but that also other preset values caused without the influence of testing values by a fault in the system to be monitored are transformed into values effecting a correction.

When applying the method according to the invention to the monitoring of safety systems of nuclear reactors with "$m$-out-of-$n$" selection switching systems, there is a particularly advantageous execution of the method according to the invention in which the disturbed "$m$-out-of-$n$" switching system changes over to an undisturbed "$p$-out-of-$q$" switching system by means of the correction operation; in this connection $m$, $n$, $p$ and $q$ mean whole numbers satisfying the conditions $m \leq n$, $p \leq q$, and $q \leq n$. This changeover may be obtained, e.g. by feeding an electric constant into logic circuit elements of the safety system.

Therefore, one device for the execution of the method according to the invention consists (a) of a transmitter of testing values coupled to the system to be monitored to generate the input testing values, (b) a receiver of testing values coupled to the system to be monitored and to the transmitter of testing values to generate the disturbance and (c) a correction unit coupled to the system to be monitored and to the receiver of testing values to generate the variables effecting correction (correction variables). The system to be monitored by means of the device according to the invention in particular may be the safety system of a nuclear reactor. If, as is generally the case, the safety system of a nuclear reactor consists of several identical switching members (safety channels) to generate a variable shutting down the nuclear reactor (shutdown variable) and if there is a group (measuring probe group) of preferably identical reactor data measuring devices (measuring probles) and, in addition, if in this case each safety channel comprises $n$ identical smaller switching elements (safety lines) to which in turn one each of the $n$ measuring probes of a predetermined group of measuring probes is assigned, then in this switching system each safety line is preferably made of at least one critical value unit and one reference unit to compare the measured variables of each group of probes (line variables) with preset critical values and to compare the deviations among the indivdual line data with preset values of deviation as well as, in addition, a logic switching circuit for the logic connection of the output variables of the critical value and reference units of the corresponding safety channel. In a specially advantageous development of the device according to the invention the logic switching circuit of each safety line comprises (a) a switching device disjunctively linking the output values of the critical value and reference units belonging to that safety line as well as the correction variable assigned to this line, and (b) another switching device disjunctively linking the output values of the critical value and reference units belonging to the other lines of the same safety channel as well as the correction variables assigned to these lines, and (c) a switching unit conjunctively linking the output values of these two disjunctive switching devices. This design of the logic switching system according to the invention permits unequivocal localizing of the fault in the affected line of the safety channel. This makes it possible to eliminate the disturbed safety line by means of the correction variable and to bring about an "automatic self-repair" of the safety channel by changing over from the "$m$-out-of-$n$" to a "$p$-out-of-$q$" system by means of the correction variable which is best designed as an electric constant. This means that a minimum number of testing values per test cycle will discover every disturbance in a line of a safety channel and that the correction variable assigned to the disturbed line can be released for the purpose of self-repair. In the device according to the invention, in which it is useful to have the transmitter of testing values consists of a generator of testing values and an address transmitter, it is an advantage to install all devices important for the safety switching system twice, especially the generator of testing values and the address transmitter, and to link them by coupling members safeguarding at any time, i.e. also during replacement, identical timing so that the device will function in any case either with the two systems connected in parallel or a least with one device only and the coupled systems always automatically adjust to the proper timing.

The generator of testing values is adapted to the testing device in a particularly useful way, if it comprises several binary stages. The binary coded output variables are provided as conjunction members producing the testing values in the sense that the number of cyclically combined testing values necessary for the test is produced in every test step and that identical testing values are always formed by the same conjunction member.

Due to a special execution of the invention the switching unit effecting shutdown of the nuclear reactor is designed by the closed-circuit principle so that in case of complete failure or partial failure of the output testing values predetermined in extent and scope a shutdown of the nuclear reactor is the result.

Of course, the proper type of signal e.g. as a light signal, are provided to show in addition immediately which part of the device has become faulty, especially in the safety switching device. In addition, the invention including the safety switching system designed according to the invention may be used also in other safety devices, e.g. in chemical, mechanical stationary and mobile traffic systems such as submarines, ships, aircraft, spacecraft or the like. For it is merely presupposed that certain parameters of the systems to be monitored are measured and compared with preset values and among each other, respectively.

Method and device are described in more detail in the following section by an example of a reactor safety system designed by the "two-out-of-three" system.

The three measured values of a reactor operating parameter measured three times, e.g. neutron flux, are fed into the inputs 1–3 (buffer and adapting amplifiers) of safety channel 4. In case additional reactor operating parameters such as fuel element temperatures or the like, are measured, each of these variables measured three times in the "two-out-of-three" system is assigned one safety channel with three inputs each (analog to inputs 1–3). The total number of safety channels make up the safety switching system. Each safety channel consists of three identical switching units, the safety lines. The safety lines each comprise a critical value unit 5, a reference unit 6, and a logic switching circuit 7 as well as a testing value input logic switching circuit 8. The outputs of the safety lines are connected to one shutdown line each 9–11. From these shutdown lines the shutdown of the nuclear reactor is effected via the shutdown system 12 in case of danger. A testing value transmitter consisting of two identical testing value generators 13 and 14 and two identical address generators 15 and 16 is coupled to this safety switching system over the testing value input logic switching circuits 8, 81, and 82. Moreover, a testing value receiver 17 is coupled to the testing value transmitter 13–16 as well as to the outputs of the safety lines through the shutdown lines 9–11. In addition, the correction unit 18 consisting of three identical logic switching circuits is coupled to the testing value receiver 17 on the one hand and the safety lines of the safety channel 4 on the other hand. The logic switching circuits 7, 71, and 72, respectively, are so designed according to the invention that it is possible by means of the testing values to locate the defective line of the safety channel automatically and separate it functionally by means of the correction value with simultaneous conversion of the "two-out-of-three" system into a "one-out-of-two" system or, more generally, a change from an "$m$-out-of-$n$" system into a "$p$-out-of-$q$" system, also by means of the correction values, where $m$, $n$, $p$ and $q$ are whole numbers satisfying the conditions $m \leq n$, $p \leq q$, and $q \leq n$.

The testing value generators 13 and 14, respectively, produce the test pulses fed to the safety lines through the testing value input logic switching circuits 8, 81 and 82. Since the individual safety channels are scanned one after the other the address generators 15 and 16 respectively, in each case produce the address which bars the testing value input logic switching system of the safety channels not being tested for the passage of testing values. When the safety switching device functions correctly, the test pulses (input testing values) go through the safety lines reaching the shutdown lines through the output of the safety lines and then the shutdown unit 12 in which no variable effecting reactor shutdown is produced (shutdown variable) as long as a preset minimum number of pulses per unit time (output test values) arrive. In case the measured values fed into the safety switching device at inputs 1–3 exceed or fall short of certain preset critical values and/or in case the deviations between two measured values exceed preset non-permissible values (reference values), then a permanent signal is generated in two out of the three shutdown lines 9–11 through the logic switching circuits 7, 71 and 72. This has a low resistance and renders the pulses on the shutdown lines ineffective, thus causing the shutdown device 12 to receive too few pulses per unit time and making it generate a shutdown variable which results in the shutdown of the nuclear reactor. This closed-circuit principle simultaneously monitors testing value transmitter, safety channels, and shutdown unit, because failure of one of these units will cause a shutdown. Normally, a "two-out-of-three" system releases a scram when two critical values, or one critical value and a reference value, or two reference values are exceeded. In case a safety line is disturbed and there are no pulses at the output of the safety line for this reason, although a test pulse arrives at its input gate, a disturbance quantity is generated in the testing value receiver 17, in which the input and output test signals are compared, and this disturbance is fed into the disturbance quantity unit 18. Here a value is produced which blocks the test value input to the defective line, and, moreover, a permanent value is fed into the logic switching circuits 7, 71 and 72, which changes the "two-out-of-three" system into a "one-out-of-two" system, i.e. after changeover there is already a shutdown of the reactor when one critical or reference value is exceeded by the measured quantities. This changeover and automatic repair is carried out in disturbances suppressing a testing or shutdown value as well as in disturbances themselves generating a disturbance quantity similar to the testing or shutdown value. Test signal generators 13 and 14, respectively, as well as address generators 15 and 16, respectively, are each installed twofold and coupled by capacitances so as to operate synchronously. In cases of defect and during replacement of a test signal generator of an address generator testing can thus be continued in the same timing without interruption and no false scram will be caused by the replacement. After replacement these units also tune into the previous timing of the test cycle (synchronisation). The test signal generators 13 and 14, respectively, are equipped with binary stages, in contrast to the shift registers so far employed which resulted in a much higher expenditure. These test signal generators 13 and 14 respectively, in each case generate two testing values in every timing cycle directly out of the binary coded output quantities of the binary stages; hence, it is possible on the basis of the design of the switching system 7, 71, 72 to discover any fault in the tested safety channel within a total of six of these timing steps in a "two-out-of-three" selection circuit and to assign it to the disturbed line. An absolutely safe system without any more danger of reactor destruction (no more any possibility of failure) results from the fact that on the basis of the invention there is immediate automatic repair and the test cycle—i.e. the time required for once testing all safety channels present is kept below the signal dead time—i.e. the time between the origin of deviating measurement signals and the initiation of shutdown. At the same time, this system permits only very few erroneous shutdowns. In this way the invention practically constitutes an ideal system for the supervision of installations by means of testing values.

Of course, the invention is not restricted to "two-out-of-three" reactor safety systems or to reactor safety systems in general; it can be easily applied in all fields in which installations, equipment and the like must be supervised.

I claim:

1. Safety system of the "$m$-out-of-$n$" type, wherein $m \leq n$, for supervising installations, including (a) at least one test signal generator means coupled to the installation being monitored, which generator induces input test signals and feeds such to the installation being monitored;
    (b) test signal receiver means coupled to the installation being monitored and to said test signal generator, which receiver means is adapted to compare said input test signals with output test signals generated by means within the installation being monitored, which receiver means combines said input and output test signals into a common disturbance signal;
    (c) correction means coupled to the installation being monitored and to the test signal receiver means, which correction means is adapted to transform said disturbance signal caused by an error in the installation being monitored into a correction signal; and
    (d) means responsive to said correction signal adapted to change said disturbed "$m$-out-of-$n$" type safety systems into an undisturbed "$p$-out-of-$q$" type safety system, wherein $p$ and $q$ are integers, $p < q$, $q < n$, within a shorter time than the response time of the safety system of the intsallation being monitored.

2. Safety system as claimed in claim 1 adapted for use with an installation, which comprises a multiplicity of identical switching units (safety channels) for the generation of a quantity resulting in installation shutdown (shutdown quantity) and a group (measurement probe group) of preferably identical installation parameter measurement devices (measurement probes) is assigned to each safety channel, and where, in addition, each safety channel comprises $n$ identical smaller switching devices (safety lines) which, in turn, are assigned one each of the $n$ measurement probes of a predetermined group of measurement probes, wherein each safety line essentially consists of one critical value unit and one reference unit to compare the measured values of each group of probes (line values) with the preset critical values and to compare the deviations among the individual line values with the preset values of deviation as well as a logic circuit device for logically connecting the output values of the critical value and reference units of the safety channel in question to generate a shutdown signal.

3. System as claimed in claim 2, wherein said logic circuit device of the safety line (a) comprises a switching device (19) disjunctively connecting the output values of the critical value and reference units belonging to the line as well as the correction quantity assigned to the line, and (b) another switching device (20) disjunctively connecting the output values of the critical value and reference units belonging to the other lines of the same safety channel as well as the correction quantities assigned to these lines, as well as (c) a switching unit (21) conjunctively connecting the output quantities of these two disjunctive switching devices (19, 20).

4. System as claimed in claim 1 including a testing value transmitter consisting of testing value generator (13, 14) and address generator (15, 16) wherein said testing value generator and address generator are installed twofold and are connected by coupling circuit members which safeguard equal timing.

5. System as claimed in claim 1, wherein said test signal generator (13, 14) comprises several binary stages (22) with the conjunction members generating testing values being provided from the binary coded output quantities such that in every test step the proper number of cyclically combined testing quantities necessary for that test is generated and that identical tesing values are always produced by the same conjunction member.

6. System as claimed in claim 1, including a shutdown unit (12) adapted to effect shutdown of the installation being supervised by a closed-circuit principle such that in case of a failure of the output testing values the installation will be shut down.

7. System as claimed in claim 1, including a multiplicity of identical safety channels.

8. System as claimed in claim 6, wherein said installation is a nuclear reactor.

References Cited

UNITED STATES PATENTS 2,973,458  2/1961  Nye ---------------- 176—24

FOREIGN PATENTS 832,366  4/1960  Great Britain.

OTHER REFERENCES

AEC Document, AECL-799, 1959, pp. 7-1-7-7; "Control Engineering," Vol. 9, No. 5, May 1962, pp. 89-93, Hill et al.

Nuclear Reactor Control Engineering, 1963, pp. 495-508.

Nuclear Safety, Vol. 2, No. 4, June 1961, pp. 16 and 17.

BENJAMIN R. PADGETT, *Primary Examiner.*

H. E. BEHREND, *Assistant Examiner.*